United States Patent [19]
Kooijman et al.

[11] Patent Number: 5,401,979
[45] Date of Patent: Mar. 28, 1995

[54] METHODS FOR INVESTIGATING AN OBJECT BY MEANS OF A REFLECTABLE RADIATION BEAM AND DEVICES SUITABLE FOR CARRYING OUT THE METHODS HAVING AN IMAGE SENSOR RIGIDLY INTERCONNECTED WITH AN OPTICAL DETECTOR

[75] Inventors: Cornelis S. Kooijman; Antonius C. M. Gieles, both of Eindhoven, Netherlands

[73] Assignee: U.S. Philips Corporation, New York, N.Y.

[21] Appl. No.: 148,807

[22] Filed: Nov. 8, 1993

[30] Foreign Application Priority Data

Nov. 9, 1992 [EP] European Pat. Off. ............ 92203424

[51] Int. Cl.⁶ ............................................. G01V 9/04
[52] U.S. Cl. .................... 250/561; 348/126; 356/376
[58] Field of Search ............... 250/561, 560, 562, 557, 250/572; 356/376; 348/126, 140, 87, 94

[56] References Cited

U.S. PATENT DOCUMENTS 5,166,753 11/1992 Tokura ................................. 348/126
5,212,390 5/1993 LeBeau et al. ....................... 250/561

FOREIGN PATENT DOCUMENTS 3829350 3/1990 Germany .

OTHER PUBLICATIONS

"Optical Position Sensing Using Silicon Photodetectors", by Bill Light, Assoc Editor, Laser & Applications, Apr. 1986, pp. 75-79.

Primary Examiner—David C. Nelms
Assistant Examiner—Que T. Le
Attorney, Agent, or Firm—Norman N. Spain

[57] ABSTRACT

Methods, devices and an image sensor for investigating an object (13) by means of a reflectable radiation beam (25) which forms a spot (24) on the object which can be moved relative to the object (13), whereby the actual position of the spot on the object is determined by means of the reflected portion of the radiation beam detected by an optical detector (23), while the desired position of the spot relative to the object is determined by means of a multidimensional image sensor (21). The radiation beam can subsequently be moved relative to the object until the actual position of the spot corresponds to the desired position of the spot, or differences between the actual and the desired position of the spot may be determined as a measure for differences in the distance between the object and a reference plane (62).

12 Claims, 4 Drawing Sheets

METHODS FOR INVESTIGATING AN OBJECT BY MEANS OF A REFLECTABLE RADIATION BEAM AND DEVICES SUITABLE FOR CARRYING OUT THE METHODS HAVING AN IMAGE SENSOR RIGIDLY INTERCONNECTED WITH AN OPTICAL DETECTOR

BACKGROUND OF THE INVENTION

The invention relates to a method of investigating an object by means of a reflectable radiation beam which forms a spot on the object which is movable relative to the object, while a portion of the radiation beam reflected by the object is detected by an optical detector and subsequently the radiation beam is moved relative to the object until the optical detector detects a predetermined desired reflection of the radiation beam.

The invention also relates to a method of investigating an object by means of a reflectable radiation beam which forms a spot on the object which is movable relative to the object, while a portion of the radiation beam reflected by the object is detected by an optical detector.

The invention further relates to devices suitable for carrying out the methods according to the invention, which devices are each provided with a radiation source, an optical detector and a displacement device for displacing a spot thrown onto an object by a radiation beam to be emitted by the radiation source.

The invention further relates to an image sensor suitable for use in the devices according to the invention.

The term "reflectable radiation beam" is understood to mean a radiation beam originating from an optical radiation source such as, for example, a laser beam originating from a laser, a beam originating from a halogen lamp, or a beam of infrared light. After investigating of the object by means of, for example, the laser beam, a laser operation may be carried out by means of the same or a different laser beam, such as laser soldering, laser engraving, laser welding, laser cutting, and other surface treatments such as are necessary, for example, for the storage of data in digital form in a data carrier, in which case an object is processed by means of a laser beam emitted by the laser and fast and accurate movements are performed by the laser beam. The same or similar treatments are possible by means of the other radiation beams mentioned.

In a method and device disclosed in German Patent DE-C2 3829350, an electronic component positioned on a pc-board is soldered on the pc-board by means of a laser beam emitted by a laser. The pc-board is provided with connection pads on which solder is provided and on which connection legs of the component are placed. The solder is melted by the laser beam and, after solidification of the solder, the connection legs of the component are mechanically and electrically connected to the connection pads of the pc-board. Before soldering is started, the connection pad to be soldered is brought into the vicinity of the laser beam. An accurate positioning of the connection pad to be soldered relative to the laser beam is achieved in that the intensity of the laser light reflected from the pc-board and the component is detected by an optical detector. The pc-board with the connection pad is subsequently moved relative to the laser beam until the laser beam is incident on the solder, during which a comparatively high intensity of the reflected laser light is measured. The pc-board is held stationary relative to the laser beam and the solder is melted by the laser beam. If the measured reflection is too low, the pc-board must be moved to and fro until the laser beam hits the solder. It cannot be determined by means of the optical detector where the solder is present. Another disadvantage of the known method and device is that the intensity value of the reflected laser light on the solder, the various components and the pc-board must be accurately known and sufficiently distinctive, because otherwise a laser soldering operation would nevertheless be carried out in locations where no solder is present and the pc-board could be burned.

SUMMARY OF THE INVENTION

The invention has for its object to provide a method by which a radiation beam can be positioned relative to an object comparatively quickly and accurately.

The method according to the invention is for this purpose characterized in that the actual position of the spot on the object is determined from the reflected portion of the radiation beam detected by means of the optical detector, while the desired position of the spot relative to the object is determined by means of a multi-dimensional image sensor, after which the radiation beam is moved relative to the object until the actual position of the spot determined by means of the optical detector corresponds to the desired position of the spot determined by means of the image sensor.

The optical detector only detects the position of the spot, the intensity of the reflected radiation beam is immaterial. As a result, the actual position of the spot can be detected comparatively quickly and accurately by the optical detector. The actual position of the spot can be determined by the optical detector continuously, also when the radiation beam is moved comparatively quickly relative to the object. The multidimensional image sensor forms at least a two-dimensional picture of at least a portion of the object, and the desired positions of the spot are determined very accurately from this image. The analysis of such an image requires comparatively much time (100 msec), but it need be performed only a small number of times. Often one image will already be sufficient for determining the desired positions of the spot on the object with sufficient accuracy. The desired positions may be, for example, the x, y coordinates in a set of coordinates x, y, z which has a fixed position relative to the image sensor and in which the image sensor forms an image of the plane x, y.

An embodiment of the method according to the invention is characterized in that the spot is moved relative to the object by means of a pivotable deflection mirror which is pivoted in dependence on the difference between the actual and the desired position of the spot detected by the optical detector and the image sensor, respectively.

A pivotable deflection minor has only a comparatively small weight so that the mirror can be pivoted comparatively quickly. A high accuracy is achieved in that a displacement of the radiation beam by a pivoting movement of the deflection mirror is immediately observed by the optical detector.

The invention also has for its object to provide a method by which differences in distance between the object to be processed or already processed and a reference plane can be measured.

The method according to the invention is for this purpose characterized in that the optical detector and a multidimensional image sensor have a common optical axis which is perpendicular to a reference plane through the object, while the positions of the spot on the object projected onto the reference plane are determined from the reflected portion of the radiation beam detected by means of the optical detector during the displacement of the radiation beam over a predetermined track, the desired positions of the spot relative to the object projected onto the reference plane being determined by means of the image sensor, after which differences between the actual and the desired positions of the spot are determined as a measure for differences in distance from the objects to the reference plane along the predetermined track.

When the radiation beam is moved along a predetermined track over a plane object, the reference plane through the object coinciding with the surface of the object, the actual positions and the desired positions will be identical. If the object is not plane, the actual position of the spot will be different from the position of the spot expected from the predetermined track of the radiation beam. The difference between the actual spot position and the expected or desired spot position is a measure for the difference in distance to the reference plane as compared with other positions on the predetermined track.

An embodiment of the method according to the invention in which the object is a component provided with connection legs which are soldered to contact pads by means of a laser acting as a heat radiation source, is characterized in that the detection of a comparatively great difference in distance between a connection leg and the reference plane compared with other connection legs leads to the conclusion that there is a contact failure between the connection leg and the contact pad, in which case the laser is switched off in order to prevent burning of the detached connection leg.

The component may be repaired or replaced after the laser has been switched off. The methods according to the invention are particularly suitable for laser soldering of electronic components on a pc-board. The electronic components are often provided with a number of connection legs arranged in a row which have to be soldered on contact pads of the pc-board. The method according to the invention described first renders it possible to determine the desired soldering positions on the connection legs or contact pads and to align the laser beam so that the laser spot is aimed at a first surface to be soldered. A track may be derived from the desired positions, along which track the laser beam is to be displaced in order to connect all connection legs to contact pads. The method described immediately above renders it possible to determine differences in the distance between connection legs and a reference plane. The reference plane is a virtual plane which may be laid, for example, at the upper sides of the average correct connection legs. The nominal distance from a correct connection leg to the reference plane in this case is zero. If a connection leg is at a comparatively great distance from the reference plane, and accordingly a mechanical pressure contact between the connection leg and the associated contact pad is absent, the laser is stopped and the component may be repaired or replaced.

A further embodiment of the methods according to the invention is characterized in that the spot of the radiation beam is positioned until the actual position corresponds to a desired position and in that the spot of the radiation beam is also used for determining differences in distance between an object and a reference plane. It is thus possible in a comparatively simple manner during the application of a radiation beam to an object on the one hand to position the spot of the radiation beam and on the other hand to determine differences in distance between the object and a reference plane.

The invention also has for its object to provide a device which is suitable for carrying out the method according to the invention and by which a radiation beam can be positioned and by which the disadvantage of the known device is avoided.

For this purpose, the device according to the invention is provided with a multidimensional image sensor cooperating with the optical detector and with a positioning circuit for controlling the radiation beam in dependence on the difference between an actual position of the spot detectable by the optical detector and a desired position of the spot detectable by the image sensor.

The use of two different imaging devices, i.e. the optical detector for determining the actual position of the spot and the multidimensional image sensor for determining the desired position of the spot, has the advantage that that imaging device can be used which is best suitable for determining the respective actual and desired positions of the spot. The optical detector is highly suitable for quickly and accurately detecting the actual, continuously changing position of the spot, while the image sensor is suitable for accurately determining the desired position of the spot from an image of the object. A comparatively high positioning accuracy of the spot is achieved owing to the displacement of the spot of the radiation beam by means of the control circuit in dependence on the difference between the actual and the desired positions.

The invention also has for its object to provide a device which is suitable for carrying out the method according to the invention by which differences in the distance between the object and a reference plane can be measured.

For this purpose, the device according to the invention is provided with a multidimensional image sensor cooperating with the optical detector, the optical detector and the image sensor having a common optical axis which is perpendicular to a reference plane, and is provided with a measuring circuit for determining differences in the distance between the object and the reference plane from differences between actual positions of the spot on the reference plane detectable by the optical detector and desired positions of the spot on the reference plane detectable by the image sensor during the displacement of the radiation beam along a predetermined track.

During the determination of distance differences between various positions on the object relative to the reference plane, it is possible to switch off the radiation source and to interrupt the radiation beam by means of the measuring circuit if a previously defined, comparatively great distance difference in relation to the reference plane is detected.

An embodiment of the device suitable for carrying out the methods according to the invention is characterized in that a common control circuit is provided with the positioning circuit and the measuring circuit.

A device is obtained thereby which is suitable for positioning the radiation beam and for determining distance differences of the object in relation to the reference plane.

An alternative embodiment of a device suitable for carrying out the methods according to the invention is characterized in that the displacement device controllable by the control circuit is provided with a pivotable deflection mirror.

The radiation beam is deflected by the pivotable deflection mirror and displaced relative to the object. As a result, the radiation source, the object, the image sensor and the optical detector need not be moved during positioning of the radiation beam, and the mass to be displaced (the mass of the deflection mirror) is small. This enhances the positioning accuracy and the positioning speed of the radiation beam. Since a displacement of the radiation beam owing to pivoting of the deflection mirror is immediately detected and can be corrected, a comparatively simple mirror can be used. It is also possible to use a mirror which is pivotable about two axes of rotation.

A further embodiment of a device suitable for carrying out the methods according to the invention is characterized in that the optical detector is provided with a position detection element.

The position of the spot can be determined quickly and accurately by means of such an element, which is commercially available.

A yet further embodiment of a device suitable for carrying out the methods according to the invention is characterized in that the image sensor is provided with a solid-state matrix array camera.

An accurate picture of the object can be obtained comparatively quickly by means of a solid-state matrix array camera such as, for example, a charge-coupled device (CCD) or a so-called charge injection device (CID), which are commercially available.

A yet further embodiment of a device suitable for carrying out the methods according to the invention is characterized in that the optical detector is mounted in the image sensor, the solid-state matrix array camera and the optical detector being rigidly connected to one another and having the same image field obtained through a common, semi-transparent mirror.

Owing to the rigid connection between the solid-state matrix array camera and the optical detector, the device is comparatively insensitive to drift, non-linearities, and hysteresis of the displacement device, to the position of the image sensor with the optical detector relative to the object, and to the position of the deflection mirror relative to the object.

BRIEF DESCRIPTION OF THE DRAWINGS

The invention will be explained in more detail with reference to the drawing in which FIG. 1 diagrammatically shows a device according to the invention, FIG. 2 diagrammatically shows an application of the device according to the invention, FIG. 3 diagrammatically depicts soldering of a number of connection legs by means of a device according to the invention.

Corresponding components in the various Figures have been given the same reference numerals.

DETAILED DESCRIPTION OF THE PREFERRED EMBODIMENTS

Figure 1:
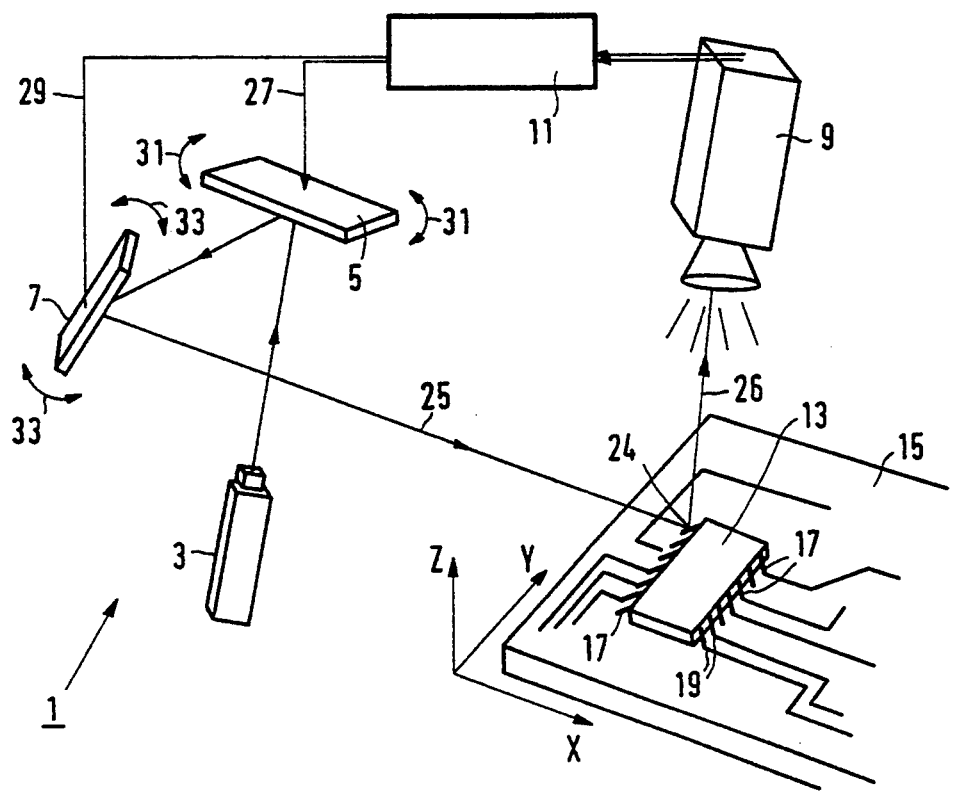

FIG. 1 diagrammatically shows a laser soldering device 1 provided with a laser 3, two pivotable deflection minors 5 and 7, an image sensor 9 and a control circuit 11. The laser soldering device 1 in the arrangement shown in FIG. 1 is used for laser-soldering an electronic component 13 on a pc-board 15. The electronic component 13 is provided with connection legs 17 which are placed on connection pads 19 of the pc-board 15. The connection legs 17 are soldered to the connection pads 19, which are provided with solder, by means of the device 1. The image sensor 9 is equipped with a charge-coupled device (CCD) 21 (solid-state matrix array camera) and an optical detector 23 which comprises a position detection element (see FIG. 2). A system of coordinates x, y, z having a fixed orientation is defined in relation to the image sensor 9. The z-axis is directed parallel to the optical axis of the image sensor 9. The operation of the laser soldering device is as follows. The component 13 to be soldered is brought into the image field of the image sensor by means of a table (not shown) which is movable in the x, y plane. A two-dimensional picture of the component, the connection legs and the connection pads on the pc-board is made by the CCD 21. The x, y coordinates of the positions to be soldered are determined from this picture. Meanwhile, the laser has been switched on and the position of the laser spot 24 on the pc-board 15 of the laser beam 25 emitted by the laser 3 is detected by the optical detector from the laser beam 26 partly reflected by the pc-board 15 or the component 13. The laser beam 25 is at an angle to the x, y plane. The laser spot position is determined so quickly that the laser beam 25 cannot damage the pc-board 15. It is also possible to reduce the power of the laser beam during searching for the desired position and to use the full laser power during soldering only. The desired position and the actual position of the laser spot 24 are compared in the control circuit 11. Depending on the difference between the two positions, electric control voltages 27 and 29 are sent to the drive units of the deflection mirrors 5 and 7 so as to pivot the mirrors in the directions of the arrows 31 and 33. The deflection mirrors 5 and 7 are galvanoscopic mirrors which are rotated through a certain angle in dependence on the value of an electric control voltage. The laser beam 25 is deflected in the x-direction by the mirror 5 and the laser beam 25 is deflected in the y-direction by the mirror 7. The actual position of the laser spot 24 is adapted to the desired position comparatively quickly, i.e. within 0.1-1 msec. After the laser beam 25 has been aimed at the desired position on the solder of the connection pad 19 on the pc-board 15, the laser beam 25 is kept in the same position for a certain period, 5-10 msec. The time depends inter alia on the laser power and the laser operation to be carried out. The solder melts and the laser beam is moved to a next position. After solidification of the molten solder there will be a mechanical and electrical connection between the connection pad 19 on the pc-board 15 and the connection leg 17 of the electronic component 13. The detection of the moment at which the solder has sufficiently melted and the laser beam may be moved to a next position may take place in various manners which are known per se. In the German Patent DE-C2 3829350 cited above, an infrared detector is used for detecting melting of the solder. It is also possible to determine the required melting time beforehand. The laser beam may alternatively be aimed at a connection leg, whereby the solder is heated by means of heat conduction through the connection leg. The optical detector 23 may be, for example, a lateral-effect photodiode as described inter alia in "Optical Position Sensing Using Silicon Photodetectors", Lasers & Applications, April 1986, pp. 75–79. A lateral-effect photodiode is also called a position sensing device (PSD).

Figure 2:
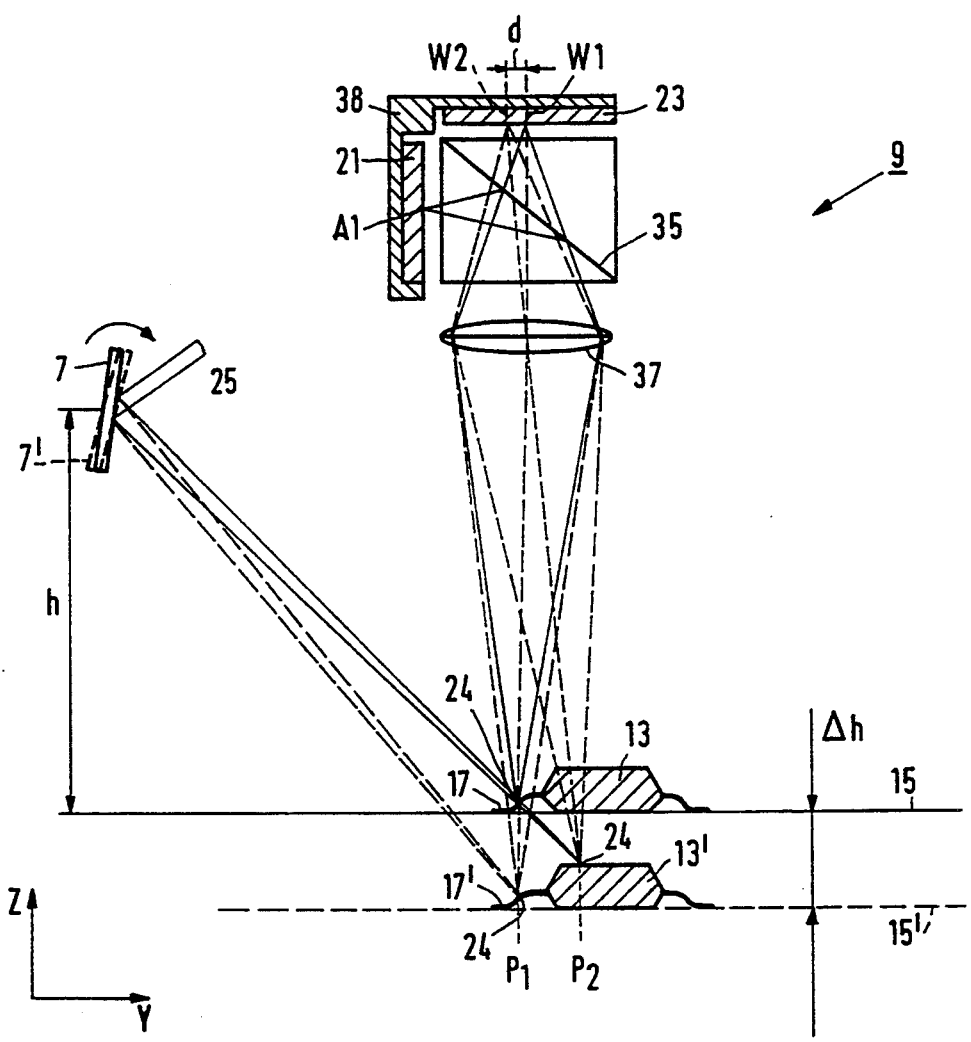

The methods and the device according to the invention are explained in more detail with reference to FIGS. 2 and 3, positioning of the laser spot in a desired position being clarified with reference to FIG. 2, and measuring of distance differences being clarified with reference to FIG. 3. The image sensor 9 shown in FIG. 2 is provided with a CCD camera 21 and a position sensing device or PSD 23 which have a common image field through a lens 37 and a semi-transparent mirror 35. The CCD camera 21 and the PSD 23 are rigidly interconnected by means of a carrier 38 in a housing (not shown) of the image sensor 9. The connection leg 17 is to be soldered on the pc-board 15 by means of the laser beam 25. The y-coordinate of the desired position P1 of the laser spot 24 is pictured through the lens 37 and the semi-transparent mirror 35 in point A1 in the CCD camera 21. The pc-board 15 is at a distance h from an axis of rotation of the pivotable mirror 7 which deflects the laser beam 25 and directs it to the pc-board 15. The laser spot position is determined by means of the PSD 23 and subsequently the mirror 7 is pivoted until the laser spot 24 is pictured through the lens 37 and the semi-transparent mirror 35 in point A1 in the CCD camera 21 and in the point W1 detected by the PSD 23. The relation between the positions detectable by means of the PSD 23 and by means of the CCD 21 has been determined beforehand by calibration.

If the pc-board 15 exhibits local sagging over a distance Δh, the laser spot 24 will hit the component 13a on the bent pc-board 15' in a y-position P2, given the same position of the mirror 7. The laser spot position detected by the PSD is now W2. A difference d between the desired position W1 corresponding to A1 and the actual position W2 is detected by the control circuit 11. An angular rotation of the mirror 7 is determined from this difference d. After the angular rotation, the mirror 7 has assumed the position indicated with 7', and the laser beam 25 is deflected onto the connection leg 17, which has a y-position P1. In spite of the sag of the pc-board 15, the laser spot 24 will nevertheless be directed onto the desired y-position P1 after the angular rotation. The proportions of the elements depicted in FIG. 2 are not true to scale. In actual fact, the distances Δh and P2–P1 are only a few millimeters, while the distance between the image sensor 9 and the pc-board 15 is a few tens of centimeters, while the lines P1–W1 and P2–W2 are substantially perpendicular to the pc-board 15. The method and device according to the invention renders it possible for the laser spot 24 to follow approximate distance differences among various components in the z-direction in the pc-board 15. When the laser beam is to solder connection legs of a next component which lies at a distance in the z-direction other than a nominal distance, a position of the mirrors is sought by means of the CCD camera, the PSD and the control circuit 11 whereby the laser spot 24 will hit the connection legs in the correct position.

The above describes positioning of the laser spot 24 on a desired position only, the laser spot 24 being positioned in the desired position in spite of, for example, sagging of the pc-board. The distance differences relative to the plane of the pc-board 15 have not been explicitly calculated.

Figure 3:
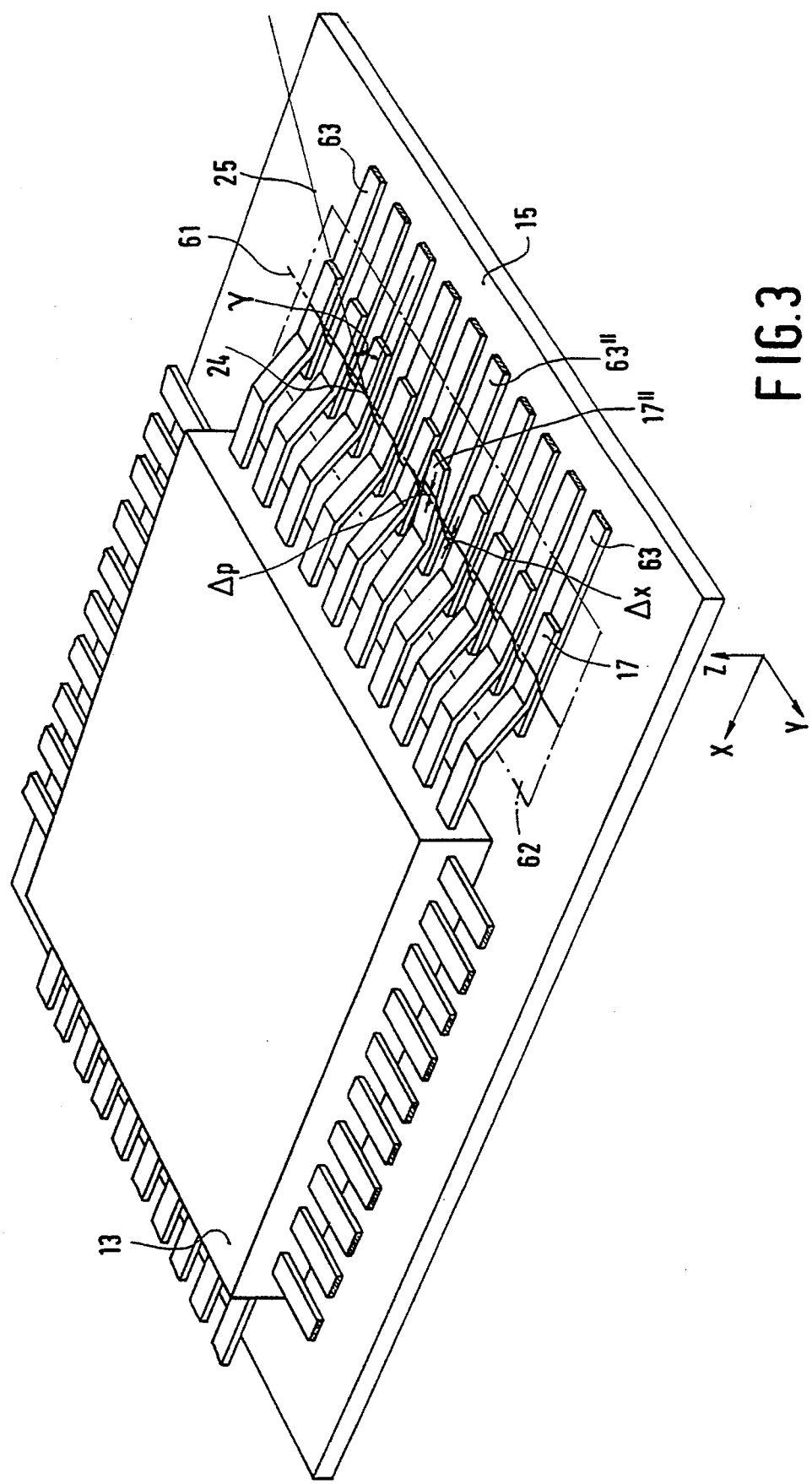

The determination of distance differences of connection legs of a component relative to a reference plane is explained further with reference to FIG. 3.

The device according to the invention is equally suited to soldering of a number of connection legs. This is also explained with reference to FIG. 3. In order to solder a number of connection legs 17 lying in one line consecutively, a line 61 is determined by means of the CCD camera 21 and the control circuit 11 along which the laser beam is to be moved. The line 61 lies in a reference plane 62 which is parallel to the x, y plane and coincides with the upper sides of the connection legs 17. Subsequently, the laser spot 24 is aimed at a first connection leg in the manner described with reference to FIG. 2, after which the laser beam is moved along the straight line 61 (the predetermined line) over the connection legs by means of the mirrors 5, 7. The laser beam remains stationary for 5–10 msec at each connection leg, and solder present between the connection legs 17 and contact pads 63 of the pc-board 15 is heated through the connection legs. Then the laser beam 25 is moved to the next connection leg. The laser beam 25 is at a fixed angle γ, of, for example, 45° to a line parallel to the x-direction. This angle remains substantially constant during the movement of the laser beam over the connection legs because the laser beam is moved substantially parallel to itself. Owing to this angle γ, the laser spot 24 does not lie on the line 61 between the contact pads 63, but is displaced in the x-direction over a distance Δx. This displacement is detected by the PSD 23 and, if the laser beam were moved comparatively slowly over the connection legs 17, the pivoting mirrors 5, 7 are so pivoted that the laser spot 24 again comes to rest on the desired line 61. In practice, the laser beam 25 is moved over the connection legs comparatively quickly, and the PSD 23 will detects the displacements Δx of the laser spot 24, but the control circuit 11 is too slow for correcting the position of the laser spot 24 for these shifts, while the pivoting mirrors 5, 7 are too slow owing to their mass inertia for following quick desired position changes. The displacements Δx detected by the PSD may then be used for the detection of a loose connection leg. If a connection leg 17" is bent and fails to make contact with the contact pad 63", a shift of the laser spot 24 in negative x-direction with a value Δp is observed by the PSD 23, while between the contact pads 23 a displacement Δx in positive x-direction is observed owing to the total height of a connection leg and a contact pad. It can be concluded from the displacement Δp that the connection leg 17' is at a higher level than the other connection legs 17 and that the connection leg 17" is loose. The laser 3 is then immediately switched off by the control circuit 11 in order to prevent burning of the connection leg 17". The component may be immediately replaced or repaired, or the loose leg may be registered in a computer (not shown) so that in a later stage the component may be replaced or repaired. A shift in the x-direction of the laser spot 24 may also be caused by thicknes differences among the connection legs and/or the contact pads. The shifts occurring in this case, however, are much smaller than the shift $\Delta x$ or $\Delta p$ occurring between two contact pads and in the case of a loose connection leg, respectively. The absence of a connection leg at the area of a contact pad may also be detected in the manner described above. It is also possible to move the laser beam once over the connection legs first in order to define the position of the reference plane and to check whether there are any loose connection legs, and to start laser soldering only afterwards.

Figure 5:
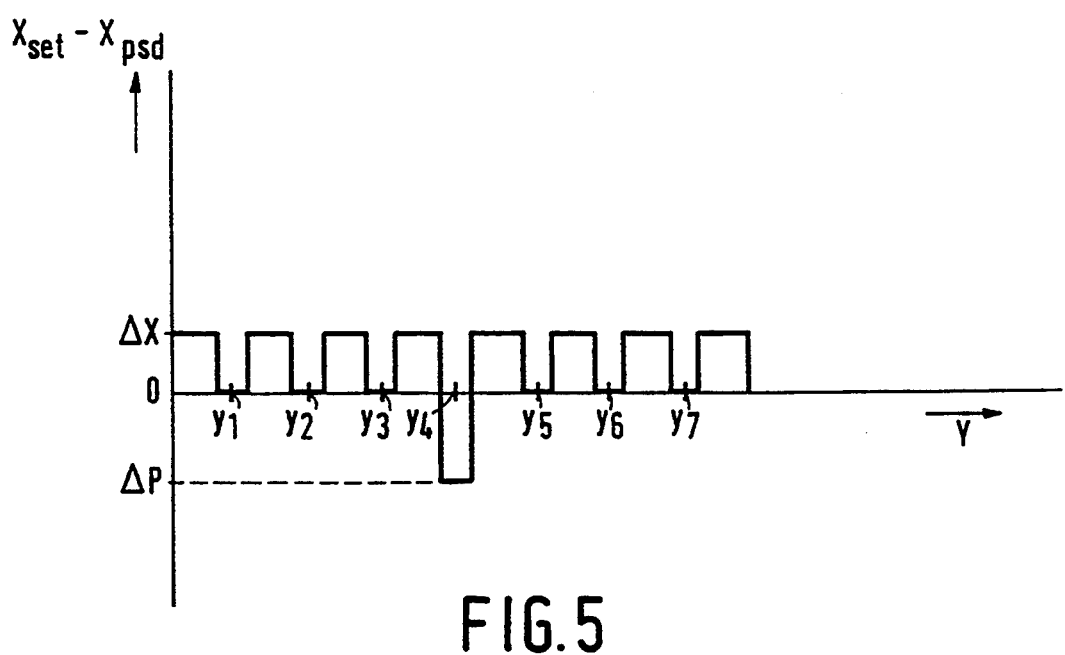
FIG. 5 is a graph showing the signal coming from an optical detector during the displacement of a laser beam over the connection legs of a component depicted in FIG. 3.
Figure 4:
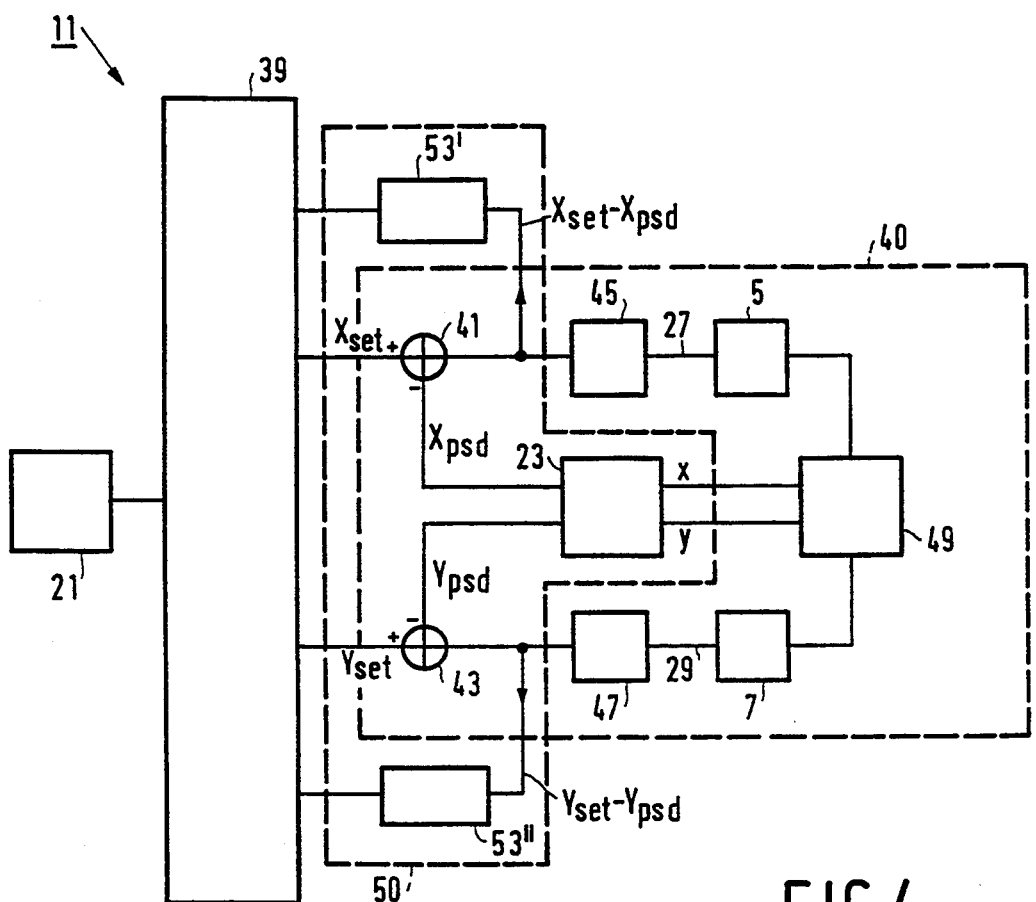
FIG. 4 is a block diagram of a control circuit for a device according to the invention.
Figure 6:
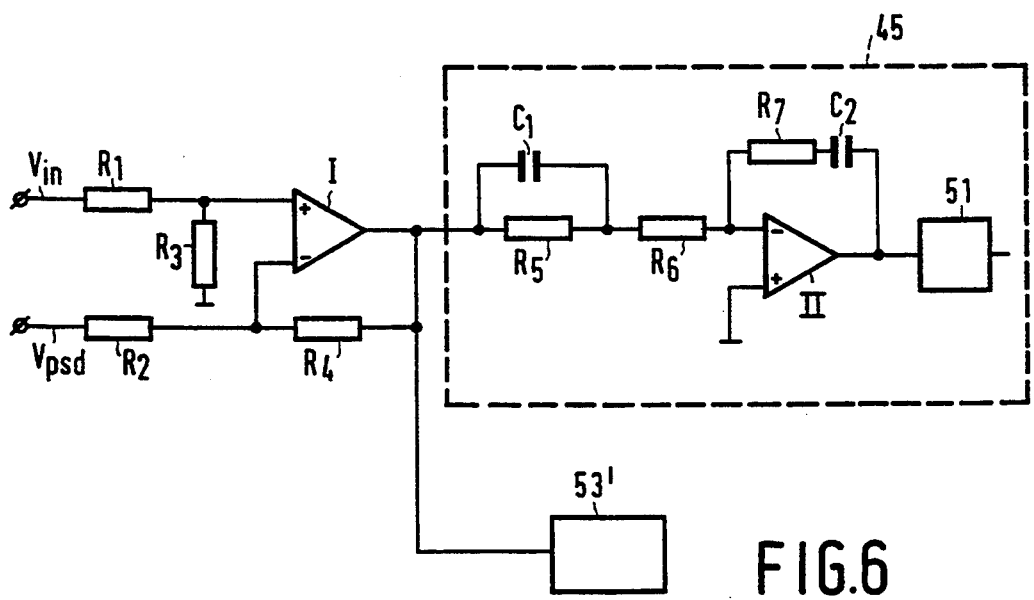
FIG. 6 shows a PID controller for the control circuit shown in FIG. 4.

FIG. 4 is a block diagram of a control circuit as used in a device 1 shown in FIG. 1. The coordinates ($x_{set}$, $y_{set}$) of the desired position of the laser spot 24 are determined by means of the CCD 21 and a computer 39. The coordinates ($x_{psd}$, $y_{psd}$) of the actual position of the laser spot 24 on the pc-board or the component are determined by means of the optical detector 23. Then a comparator 41, 43 determines the difference between the respective x and y coordinates of the desired and the actual position of the laser spot 24. The voltages corresponding to these differences are supplied to respective PID controllers 45 and 47 (proportional-differentiating-integrating controllers) of a positioning circuit 40. The PID controllers 45, 47 then send control voltages 27, 29 to the respective drive units of the deflection mirrors 5 and 7, whereby the mirrors 5, 7 are pivoted through angles $\alpha$ and $\beta$, respectively. These pivoting movements, which take place from a stationary position of the laser spot, then result in a range of desired x, y positions of the laser spot 24. The x, y position of the laser spot 24 depends inter alia on the position of the pc-board or component relative to the mirrors 5, 7. It was found in practice that the mirrors 5 and 7 deflect the laser beam not only in the x-direction and the y-direction, respectively, but also to a small extent in the y-direction and x-direction, respectively. The overall mechanical system of the device, including the dimensions of the device and the mutual interaction of the mirrors in the control circuit 11, are represented by means of block 49. Block 49 represents the process to be controlled. The differences between the respective x- and y-coordinates of the desired and the actual position of the laser spot 24 determined with the comparators 41, 43 are also used for detecting loose connection legs. The voltages corresponding to these differences are supplied to a measuring circuit 50 which comprises two peak detection elements 53', 53". It is determined by means of the peak detection elements 53', 53" whether the difference between the desired and the actual x- and y-coordinate exceeds a predetermined value. FIG. 5 shows a graph of the signal coming from the PSD during the displacement of the laser beam 25 along the line 61 in the y-direction over the connection legs of the component depicted in FIG. 3. The y-position is plotted on the horizontal axis and the difference between the desired and the actual x-position on the vertical axis. When the difference $x_{set} - x_{psd}$ equals zero, the laser spot lies on a connection leg. Between the connection legs 17, a shift $\Delta x$ of the laser spot occurs in the positive x-direction. The shift $\Delta x$ is detected in the peak detection element 53' and passed on to the computer 39. The desired y-positions ($y_1$–$y_7$) of the connection legs 17 are known to the computer 39 from the picture determined by means of the CCD 21, and the shift $\Delta x$ is interpreted as an expected shift of the laser spot between two connection legs. At the connection leg 17'", whose y-position is $y_4$, there is a shift $\Delta p$ of the laser spot in the negative x-direction. The shift $\Delta p$ is detected in the peak detection element 53' and passed on to the computer 39, where this shift is interpreted as a loose connection leg. The position of the loose connection leg 17" is stored in the computer 39 and the laser 3 is switched off by the computer 39 to prevent burning of the connection leg. FIG. 6 shows a PID controller 45 which is suitable for use in the control circuit of FIG. 4. $V_{in}$ is a voltage corresponding to the desired $x_{set}$ coordinate of the laser spot 24, while $V_{psd}$ is a voltage corresponding to the actual $x_{psd}$ coordinate. The voltages $V_{in}$ and $V_{psd}$ are compared with one another in an operational amplifier (op amp) I, after which the resulting differential voltage is amplified. A controller is constructed from resistors (R1-R7), capacitors (C1-C2) and a further operational amplifier II in usual manner, which controller has a proportional, differentiating, and integrating action. The output voltage of the controller 45 is further amplified in an end stage 51, after which the final voltage $V_{out}$ is applied to the drive unit of the pivoting mirror 5.

The measuring circuit 50 may be used separately, the position of the laser not being fed back but being controlled by means of feedforward control only. Similarly, the positioning circuit 40 may be used separately, in which case no distance measurement in relation to a reference plane is carried out. Instead of a CCD camera, alternative solid-state matrix array cameras such as, for example, a CID (Charged injection device) or valve-based cameras such as VIDICON, PLUMBICON, etc may be used.

The optical detector need not be a lateral-effect photodiode, but may be any optical element by which the position of a laser spot can be quickly detected. Suggestions here are, for example, a diffusion plate (for example, a frosted glass plate) through which the laser beam passes and behind which four diodes are arranged which each receive a certain quantity of laser light depending on the position of the laser beam on the diffusion plate. The position of the laser beam can be determined from the distribution of the light quantity over the diodes.

If the material from which the optical detector or image sensor is manufactured is partly transparent to the laser light, the optical detector and the image sensor may also be fastened one on the other.

It is possible to use one pivoting mirror, which is pivotable about two mutually perpendicular axes, instead of two pivoting mirrors for moving the laser beam.

A lens is required for focusing the laser beam. The laser beam may be moved in that this lens is displaced in a direction transverse to the axis of the laser beam.

It is possible to work, instead of with one laser beam, with two or more pulsed laser beams which are simultaneously aimed at the object but are controlled at different frequencies. The different laser beams can be distinguished from one another by means of electronics known per se and only one optical detector because of the different frequencies, and the positions of the laser spots can thus be determined.

After the desired positions of the laser spot have been determined by means of the image sensor, the image sensor may be used during laser soldering for inspecting the soldering process.

Instead of with a laser beam with which both the positioning and the soldering are carded out, it is also possible to work with two laser beams which have a partly shared optical axis, a laser beam having a comparatively low power being used for soldering. The laser having the higher power is switched on during soldering only.

The optical axis of the camera may also be at an angle to the plane of the pc-board, in which case the desired and actual x, y-coordinates of the laser spot may be derived by means of a few goniometric equations.

During laser operation, the laser spot may be held stationary on the desired positions or may be moved over the desired positions in a continuous movement. The power of the laser beam may be increased at the desired positions.

We claim:

1. A method of investigating an object by means of a reflectable radiation beam which forms a spot on the object which is movable relative to the object, while a portion of the radiation beam reflected by the object is detected by an optical detector and subsequently the radiation beam is moved relative to the object until the optical detector detects a predetermined desired reflection of the radiation beam, characterized in that the actual position of the spot on the object is determined from the reflected portion of the radiation beam detected by means of the optical detector, while the desired position of the spot relative to the object is determined by means of a multidimensional image sensor, after which the radiation beam is moved relative to the object until the actual position of the spot determined by means of the optical detector corresponds to the desired position of the spot determined by means of the image sensor.

2. A method as claimed in claim 1, characterized in that the spot is moved relative to the object by means of a pivotable deflection mirror which is pivoted in dependence on the difference between the actual and the desired position of the spot detected by the optical detector and the image sensor, respectively.

3. A method of investigating an object by means of a reflectable radiation beam which forms a spot on the object which is movable relative to the object, while a portion of the radiation beam reflected by the object is detected by an optical detector, characterized in that the optical detector and a multidimensional image sensor have a common optical axis which is perpendicular to a reference plane through the object, while the positions of the spot on the object projected onto the reference plane are determined from the reflected portion of the radiation beam detected by means of the optical detector during the displacement of the radiation beam over a predetermined track, the desired positions of the spot relative to the object projected onto the reference plane being determined by means of the image sensor, after which differences between the actual and the desired positions of the spot are determined as a measure for differences in distance from the objects to the reference plane along the predetermined track.

4. A method as claimed in claim 3, in which the object is a component provided with connection legs which are soldered to contact pads by means of a laser acting as a heat radiation source, characterized in that the detection of a comparatively great difference in distance between a connection leg and the reference plane compared with other connection legs leads to the conclusion that there is a contact failure between the connection leg and the contact pad, in which case the laser is switched off in order to prevent burning of the detached connection leg.

5. A method as claimed in claim 3, characterized in that the spot of the radiation beam is positioned until the actual position corresponds to a desired position and in that the spot of the radiation beam is also used for determining differences in distance between an object and a reference plane.

6. A device for investigating an object which device is provided with a radiation source, an optical detector and a displacement device for displacing a spot thrown onto an object by a radiation beam to be emitted by the radiation source, characterized in that the device is further provided with a multidimensional image sensor cooperating with the optical detector and with a positioning circuit for controlling the radiation beam in dependence on the difference between an actual position of the spot detectable by the optical detector and a desired position of the spot detectable by the image sensor.

7. A device as claimed in claim 6, characterized in that the optical detector is provided with a position detection element.

8. A device as claimed in claim 6, characterized in that the image sensor is provided with a solid-state matrix array camera.

9. A device as claimed in claim 8, characterized in that the optical detector is mounted in the image sensor, the solid-state matrix array camera and the optical detector being rigidly connected to one another and having the same image field obtained through a common, semi-transparent mirror.

10. A device for investigating an object which device is provided with a radiation source, an optical detector and a displacement device for displacing a spot thrown onto an object by a radiation beam to be emitted by the radiation source, characterized in that the device is further provided with a multidimensional image sensor cooperating with the optical detector, the optical detector and the image sensor having a common optical axis which is perpendicular to a reference plane, and is provided with a measuring circuit for determining differences in the distance between the object and the reference plane from differences between actual positions of the spot on the reference plane detectable by the optical detector and desired positions of the spot on the reference plane detectable by the image sensor during the displacement of the radiation beam along a predetermined track.

11. A device as claimed in claim 10, characterized in that a common control circuit is provided with the positioning circuit and the measuring circuit.

12. A device as claimed in claim 11, characterized in that the displacement device controllable by the control circuit is provided with a pivotable deflection mirror.

* * * * *